Nov. 29, 1938.   V. L. NELSON   2,138,426
CONTROL FOR MOTOR VEHICLE CLUTCHES, BRAKES, AND TRANSMISSIONS
Filed Aug. 18, 1937   3 Sheets-Sheet 2
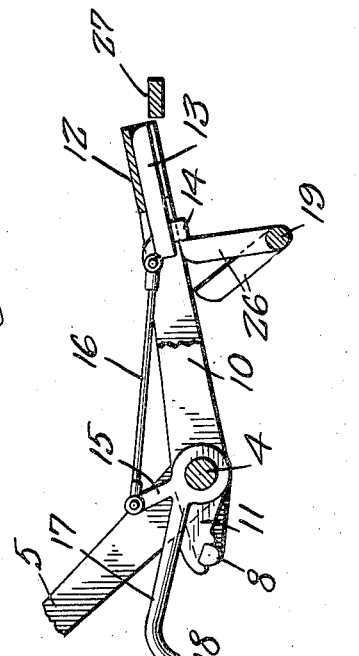
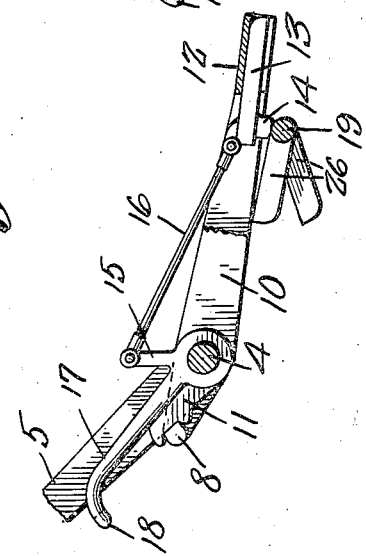
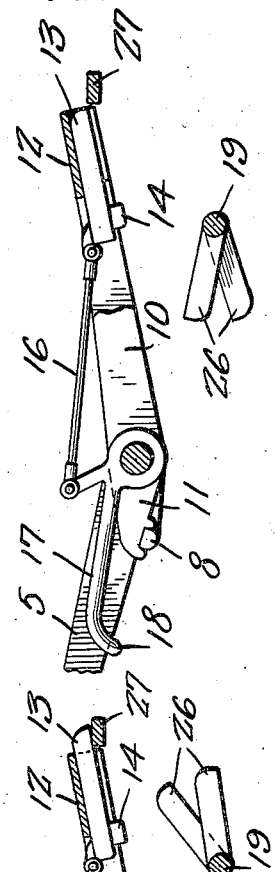
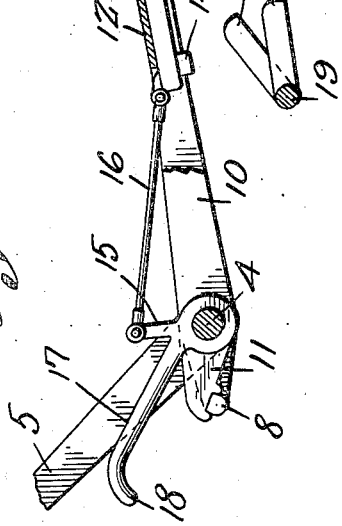
Vernon L. Nelson,
INVENTOR
BY Victor J. Evans & Co.
ATTORNEYS Nov. 29, 1938.   V. L. NELSON   2,138,426
CONTROL FOR MOTOR VEHICLE CLUTCHES, BRAKES, AND TRANSMISSIONS
Filed Aug. 18, 1937   3 Sheets-Sheet 3
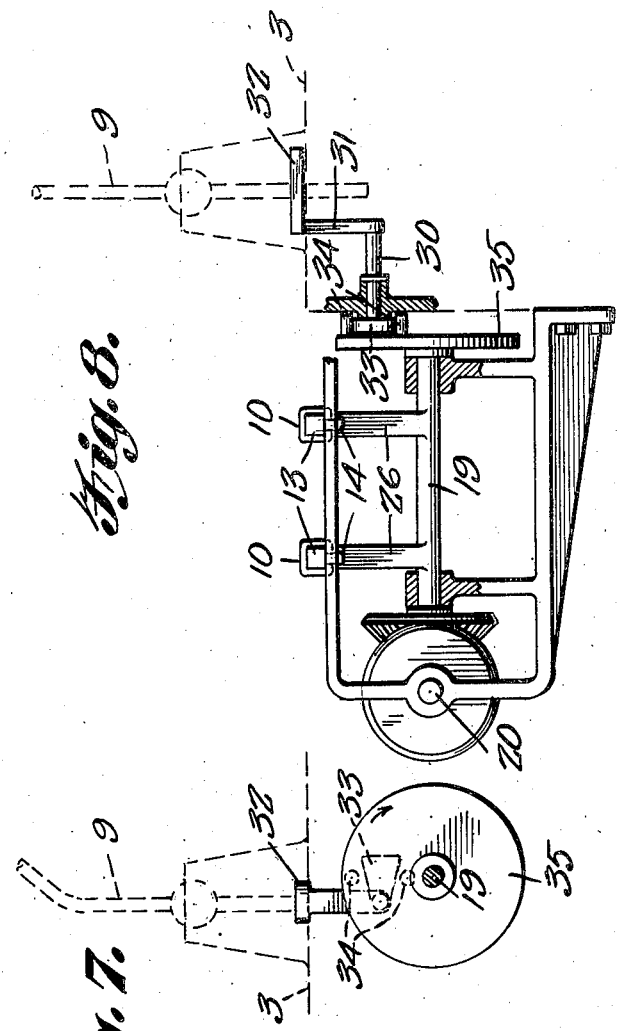
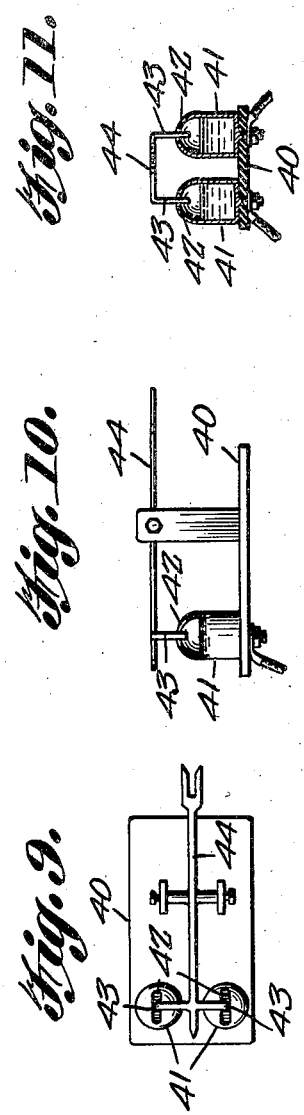
Vernon L. Nelson,
INVENTOR Patented Nov. 29, 1938

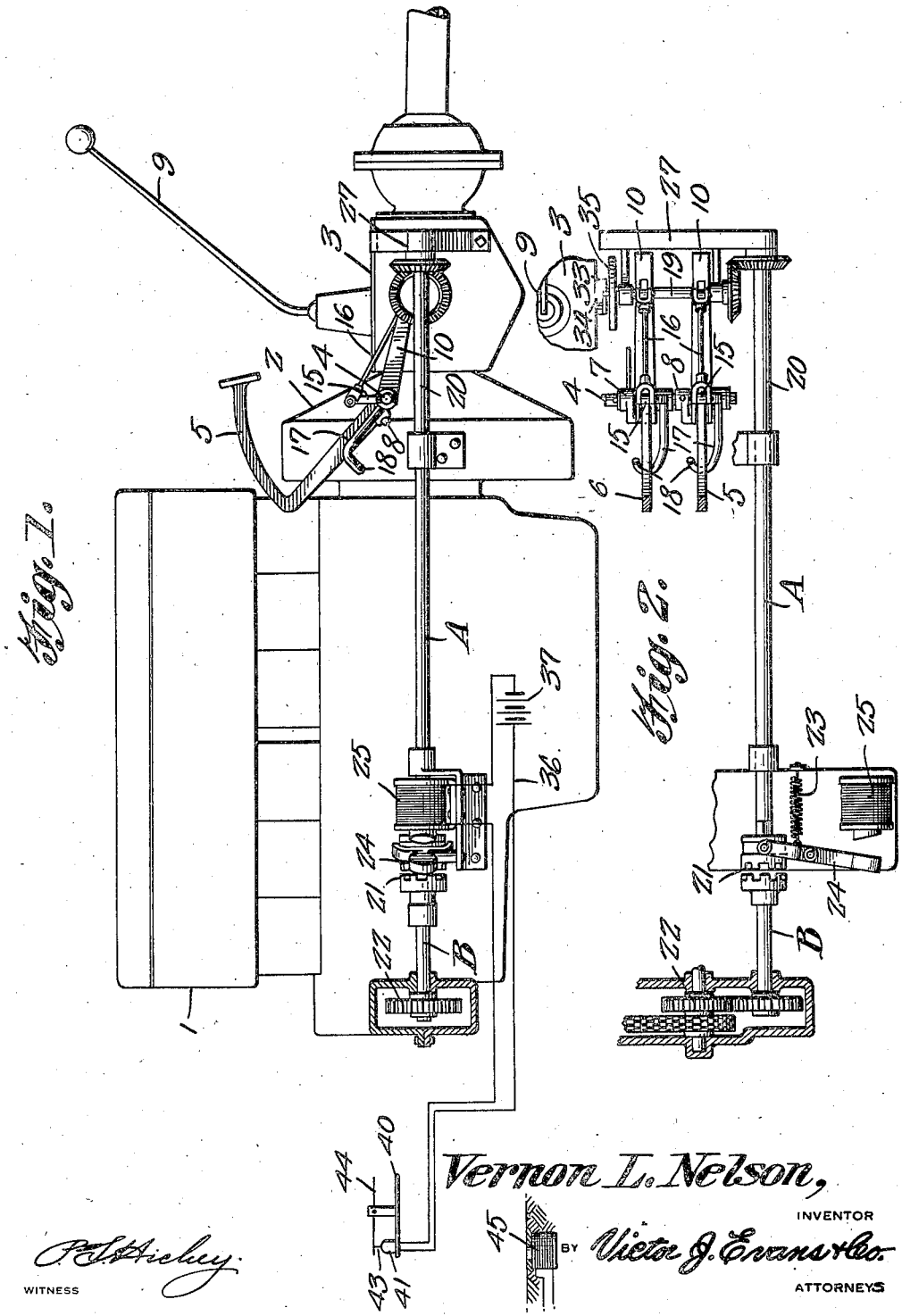

2,138,426

UNITED STATES PATENT OFFICE 2,138,426

CONTROL FOR MOTOR VEHICLE CLUTCHES, BRAKES, AND TRANSMISSIONS

Vernon L. Nelson, Collbran, Colo.

Application August 18, 1937, Serial No. 159,756

5 Claims. (Cl. 192—4)

This invention relates to a traffic signal and more particularly to a device for preventing a motor vehicle from leaving a danger zone or selected area after entering the same until the danger has passed and has for the primary object the provision of a device of this character which may be made to operate in conjunction with an electric signal so that when a danger or red light signal is against a motor vehicle equipped with this invention the motor vehicle will be automatically stopped on reaching the selected area located adjacent the traffic signal and will be held in said area against operation or procedure until the danger or red light signal changes to a safety or green light signal, consequently preventing the operator of a motor vehicle from driving said motor vehicle past the danger or red light signal when the latter is in operation.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section illustrating an engine of a motor equipped with my invention.

Figure 2 is a fragmentary top plan view partly in section showing the invention and its connection to the engine, clutch and brake pedals and the transmission of the motor vehicle.

Figure 3 is a fragmentary side elevation partly in section showing the means of operating either the brake or clutch of the motor vehicle.

Figure 4 is a view similar to Figure 3 showing the brake or clutch operating means being actuated to bring about either the application of the brakes or the disengagement of the clutch.

Figure 5 is a view similar to Figures 3 and 4 showing the device for operating the brake or clutch in an operative position to bring about either the application of the brakes or the disengagement of the clutch.

Figure 6 is a view similar to Figures 3, 4 and 5 showing the device being released either by the clutch or brake pedal by the latter being depressed.

Figure 7 is a fragmentary sectional view showing the connection of the invention with the gear shift lever of the transmission.

Figure 8 is a fragmentary transverse sectional view showing the same.

Figure 9 is a top plan view illustrating a mercury type switch for controlling an electric circuit and including a sensitized needle.

Figure 10 is a side elevation partly in section illustrating the same.

Figure 11 is a transverse sectional view illustrating the switch.

Referring in detail to the drawings, the numeral 1 indicates an engine of a motor vehicle, 2 a clutch mechanism and 3 a transmission. The clutch mechanism is of a conventional construction including an operating shaft 4 on which is journaled a clutch pedal 5 and a brake pedal 6. An arm 7 is journaled on the shaft 4 and has an offset extending into the path of movement of the brake pedal 6 so that when the brake pedal is depressed the arm 7 is rocked on the shaft 4. The arm 7 operates in the usual manner the brake mechanism of the motor vehicle.

An arm 8 similar to the arm 7 is secured on the shaft 4 and has an offset extending into the path of movement of the clutch pedal so that when the clutch pedal is manually depressed the arm 8 will cause the shaft 4 to rotate and disengage the clutch.

The transmission is controlled by the usual gear shift lever 9. To adapt the present invention to the engine, clutch mechanism and brake control mechanism of the vehicle only a slight variance in construction is made over what is employed upon the present motor vehicle and that is the use of the arms 7 and 8.

Levers 10 are journaled on the shaft 4 adjacent the clutch and brake pedals and each includes on its pivoted end a forked extension 11 to move in contact with the arms 7 and 8 when said levers are rocked on the shaft in one direction. The levers also include guides 12 slidably supporting latches 13 each having a lug 14. Bell crank levers 15 are journaled on the shaft 4 and one arm of each lever is connected to the latches 13 by links 16 while the other arms, indicated by the character 17 have hook-shaped ends 18 lying in the path of movement of the clutch and brake pedals 5 and 6.

An operating shaft 19 is rotatably supported on the motor vehicle in any well known manner adjacent the shaft 4 and is geared to a shaft 20, the latter also being suitably journaled on the motor vehicle and extending alongside of the engine, clutch mechanism and transmission. The shaft 20 includes sections to be connected and disconnected by a clutch 21. The sections of the shaft 20 are indicated by the characters A and B, the section A being geared to the shaft 19 and the section B is geared or otherwise connected to a power takeoff of the engine, as illustrated at 22 so that the section B of the shaft 20 is continuously rotated by the engine. The clutch 21 is normally disengaged by the action of a spring 23 connected to the lever 24 of the clutch 21. The lever is pivotally mounted and the free end is acted upon by an electro-magnet 25 which when energized will rock the lever on its pivot and engage the clutch 21 for connecting the sections A and B of the shaft.

Arms 26 are secured on the shaft 19 and one spaced slightly in advance of the other. During the rotation of the shaft 19 the arms 26 engage with the levers 10 and rock said levers upwardly, moving the extensions 11 downwardly and they engaging the arms 7 and 8 bring about disengagement of the clutch 2 of the engine 1 and the application of the brakes of the motor vehicle. The arms 26 during their movement with the shaft 19 also engage the lugs 14 of the latches 13, causing said latches to slide in the guides 12 and engage with a lock bar 27. The lock bar is suitably mounted on the vehicle and is normally in a plane above the free end of the levers 10 until said levers are rocked by the arms 26 in an upward direction. The latches 13 engaging with the lock bar hold said levers elevated with the extensions 11 thereof moved downwardly. The extensions 11 being moved downwardly bring about disengagement of the clutch 2 first and then the application of the brakes of the motor vehicle. To free the latches 13 from the lock bar 27 the clutch and brake pedals 5 and 6 are manually depressed and their downward movement engages the arms 17 of the bell crank levers which through the links 16 slide the latches away from the lock bar so that the levers 10 may move downwardly when the clutch and brake pedals are allowed to rise by the manual release thereof.

A shaft 30 is journaled in the housing of the transmission 3 and has secured to one end a crank element 31 including a forked portion 32 to engage with the gear shift lever 9 of the transmission. A tapered member 33 is secured to the other end of the shaft to be engaged by spaced pins 34 eccentrically mounted on a disc 35 secured on the shaft 19 so that when the shaft 19 is rotated to operate the clutch 2 and brake mechanism of the motor vehicle as heretofore described, the pins 34 will engage the tapered member 33 and impart a limited rotation to the shaft 30 so that the member 31 will bring about movement of the gear shift lever 9 to a neutral position, thus further interrupting the drive between the engine of the motor vehicle and the traction wheels of said vehicle, making it necessary for the operator of the motor vehicle to again place the transmission in gear before it is possible to start the motor vehicle under its own power. It also is to be understood that the operator must also depress the clutch and brake pedal so as to free the latches 13 from the lock bar before the brakes will be released and the clutch 2 again operable manually in the usual manner.

The electromagnet 25 which operates the clutch 21 is connected in an electric circuit 36 including an electrical source 37 and a mercury type switch 40. The switch 40 is mounted on the motor vehicle in any suitable way and includes mercury chambers 41 having openings 42 to slidably receive contacts 43 forming an integral part of a magnetized needle 44. The needle 44 is pivotally mounted and balanced so that the contacts are normally disengaged from the mercury in the chambers 41 breaking the circuit 36. An electromagnet 45 is connected in an electric circuit of the danger or red signal light of a traffic signal (not shown). The electromagnet 45 is placed at a selected distance from the traffic signal within the street as shown in Figure 1 and when the danger or red light signal is illuminated the magnet 45 will be energized and the energization of the electromagnet 45 will affect the magnetized needle 44 when the latter is within a certain distance of the electromagnet or the traffic signal. The electromagnet 45 acting on the needle causes the same to rock on its pivot and the contacts 43 engage with the mercury in the mercury containers 41 and thereby complete the electric circuit 36 bringing about energization of the magnet 25. The magnet 25 on being energized operates the clutch 21 to connect the sections A and B of the shaft 20, permitting the shaft 19 to be driven from the engine. The shaft 19 being rotated first brings about disengagement of the clutch 2 and the application of the brakes of the motor vehicle and then through the rotation of the disc 35 brings about movement of the gear shift lever into neutral position. Thus it will be seen that when the motor vehicle reaches a place within a selected area and with the danger or red signal light thereagainst will be automatically stopped and maintained against further procedure by the operator until the danger or red signal light circuit is broken to bring about deenergization of the electromagnet 45. The operator of the vehicle on receiving the "go" or green light of the traffic signal may then manually start the automobile through the manipulation of the clutch, brake pedal and transmission shift lever 9 as before described.

What is claimed is:

1. A device of the character set forth including a motor vehicle having an engine, a clutch mechanism, a brake mechanism and a transmission, a rotatable shaft mounted on said motor vehicle, means actuated by said shaft and connected with the clutch and brake mechanism and with the transmission to render said clutch mechanism disengaged, the brake mechanism applied and the transmission mechanism inoperative on the rotation of said shaft, a drive means between said shaft and the engine, and an electrical means for controlling said drive means.

2. A device of the character set forth including a motor vehicle having an engine, a clutch mechanism, a brake mechanism and a transmission, a rotatable shaft mounted on said motor vehicle means actuated by said shaft and connected with the clutch and brake mechanism and with the transmission to render said clutch mechanism disengaged, the brake mechanism applied and the transmission mechanism inoperative on the rotation of said shaft, a drive means between said shaft and the engine, and including an electrically operated clutch.

3. A device of the character set forth including a motor vehicle having an engine, a clutch mechanism, a brake mechanism and a transmission, a rotatable shaft mounted on said vehicle, a clutch, brake and transmission operating devices connected with the clutch mechanism, brake mechanism and transmission of the motor vehicle and including levers rotatably mounted, means carried by said rotatable shaft for imparting movement to said levers to render the clutch mechanism inoperative, the brake mechanism applied and the transmission inoperative, a drive means between the engine and said shaft, and electrical means for controlling said drive means.

4. In combination with clutch and brake pedals and a transmission shifting lever of a motor vehicle, a shaft rotatable on said motor vehicle, means for driving said shaft by the engine of the motor vehicle, electrical means to render said first means operative to rotate the shaft, movably mounted levers on said vehicle, means for connecting said levers to the brake and clutch pedals, latches carried by said levers, a lock bar carried by the motor vehicle, means connected with said shaft for moving said levers and latches to engage the latter with a lock bar and to disengage the clutch of the motor vehicle and apply the brakes.

5. In combination with clutch and brake pedals and a transmission shifting lever of a motor vehicle, a shaft rotatable on said motor vehicle, means for driving said shaft by an engine of the motor vehicle, electrical means to render said first means operative to rotate the shaft, movably mounted levers on said vehicle, means for connecting said levers to the brake and clutch pedals, latches carried by said levers, a lock bar carried by the motor vehicle, means connected with said shaft for moving said levers and latches to engage the latter with a lock bar and to disengage the clutch of the motor vehicle and apply the brakes, and means connected with said rotatable shaft to engage the gear shift lever and render the transmission of the vehicle inoperative.

VERNON L. NELSON.